United States Patent Office 3,485,038
Patented Dec. 23, 1969

3,485,038
HYDRAULICALLY OPERABLE DRIVE MEANS
George Roy Martin and John Robert Botting, Dunedin, South Island, New Zealand, assignors to Martin & Botting Developments Limited, Dunedin, South Island, New Zealand, a corporation of New Zealand
Filed Dec. 28, 1967, Ser. No. 694,235
Claims priority, application New Zealand, Jan. 11, 1967, 145,680; June 28, 1967, 149,249
Int. Cl. F03g 7/00
U.S. Cl. 60—22          10 Claims

ABSTRACT OF THE DISCLOSURE

A hydraulic motor provided by an inner tank having a buoyancy chamber in the base thereof reciprocally operable within an outer tank with valve means arranged to control the flow of liquid between the two tanks so that the buoyancy chamber will raise the inner tank on the upward stroke and the weight of the inner tank including the weight of water held therein will provide a thrust on the downward stroke.

---

This invention relates to hydraulically operable drive means.

In many circumstances there is an ample supply of water but with existing equipment it is difficult to utilize the water in a manner such that a useful source of power is provided, for example, to pump water. Where a sufficient head of water is available it is possible to use a hydraulic ram. We believe in many instances it is difficult to provide a sufficient head of water to ensure the satisfactory operation of the hydraulic ram and in many cases it is difficult to forecast the characteristics of a hydraulic ram once installed. We believe there is a need for a simpler means of utilization of a supply of water to provide a source of power.

It is an object of the present invention to provide a drive means which can be used for example for pumping water which will operate without any external source of power.

It is a further object of the present invention to provide a hydraulically operable drive means which will operate with a low head of water to generate a considerable force.

It is a further object of the present invention to provide a hydraulically operable drive means which will function for long periods with little or no maintenance and will continue to function provided there is a flow of water through the apparatus.

These and other objects will become clear from the following description which defines one preferred form of the invention and modifications thereof.

Figure 1:
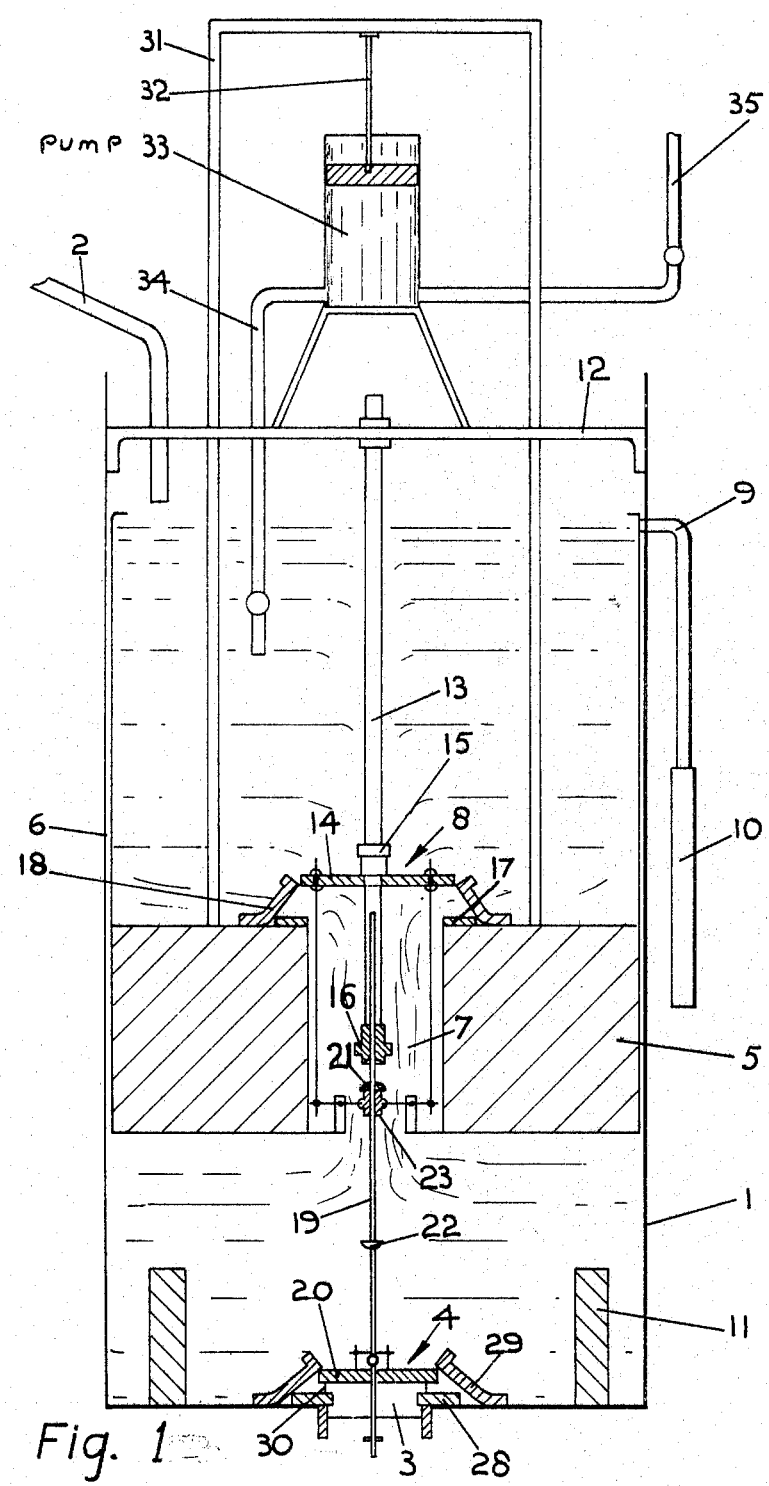
Figure 2:
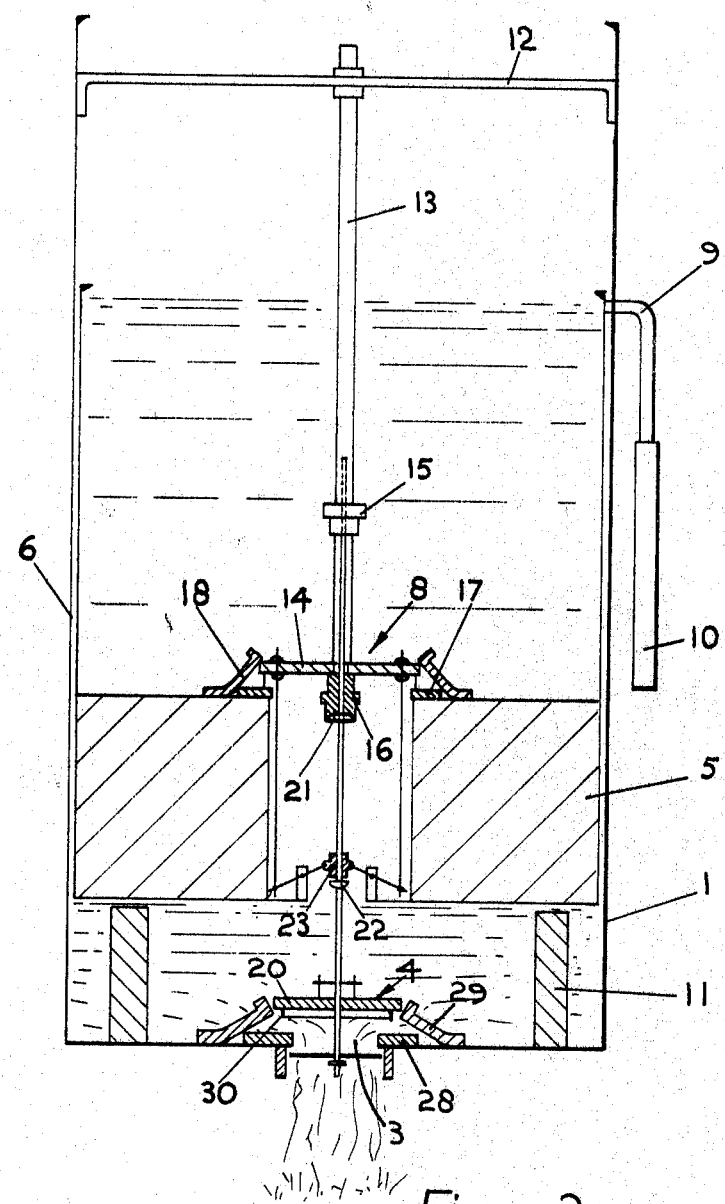
Figure 3:
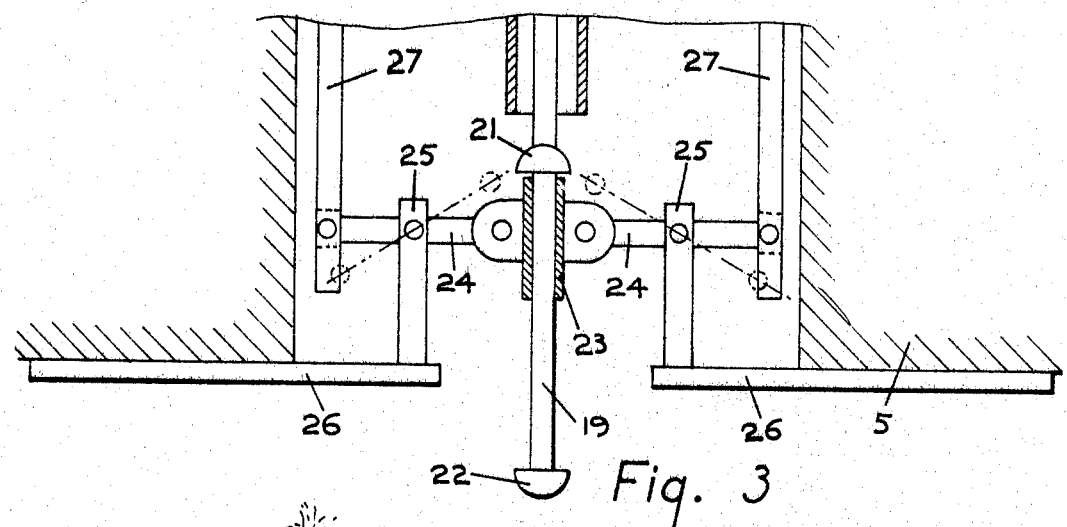
Figure 4:
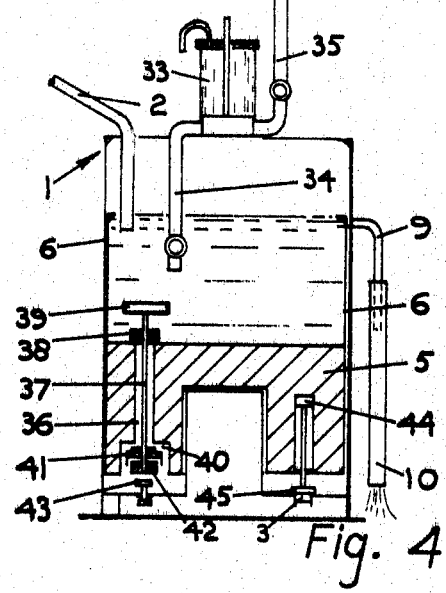
Figure 5:
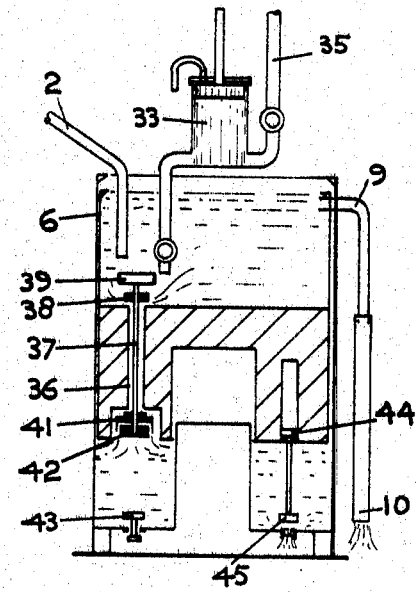
Figure 6:
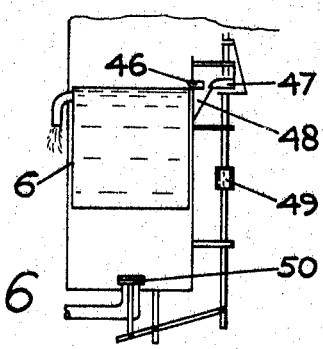
Figure 7:
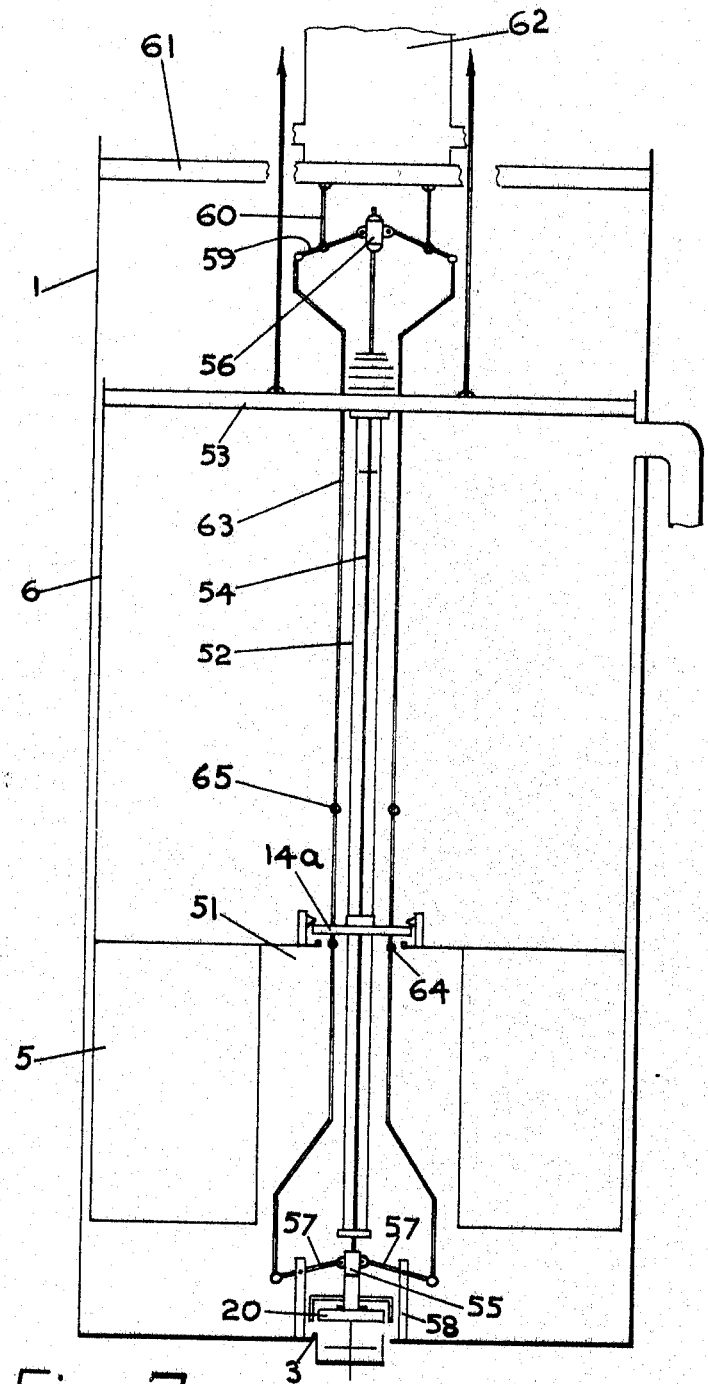

The invention and modifications will now be particularly described with reference to the accompanying drawings in which FIGURE 1 is a diagrammatic sectional view through apparatus according to the present invention, FIGURE 2 is a diagrammatic sectional view through part of the apparatus showing the float in the lower position, FIGURE 3 is a detail of the link mechanism used to control the valve, FIGURE 4 is a diagrammatic view of an alternative form of the invention, FIGURE 5 is a diagrammatic view of the apparatus in FIGURE 4 with the float in the raised position, FIGURE 6 is a yet further form of control which may be used in the present invention and FIGURE 7 is a yet further form of valve control or actuating means which may be used in the present invention.

In one preferred form of the invention a hydraulically operable drive means is constructed as follows:

A main reservoir or container 1, for example a cylindrical tank, is provided and is arranged to be installed at a convenient place to receive a supply of water through an inlet 2, for example through an inlet pipe. An outlet 3 is centrally positioned in the base of the reservoir 1 and the outlet is controlled by valve means 4 as will be further described later.

Mounted within the reservoir 1 is a float means including a buoyance chamber 5 of the same cross sectional shape as the reservoir 1 and arranged to move freely within the parallel sides of the reservoir. The float means also incorporates a float reservoir 6 positioned above the buoyance chamber by extending the outer walls thereof upwardly. A centrally positioned aperture 7 extends through the buoyance chamber 5 thus connecting the reservoir 1 with the float reservoir 6. A further valve means 8 is arranged to control the flow of water from the float reservoir through the aperture 7 and into the reservoir 1.

An outlet conduit 9 from the float reservoir is operable to move within a slot in the side wall of the reservoir 1 to discharge water into an overflow conduit 10. Also stop members 11 are provided in the base of the reservoir 1 to limit the travel of float means assuming there was a malfunction of the valve means.

The float means is arranged to reciprocate between two positions in the reservoir 1 with the movement controlled by the valve means. With the valve means in one position the water is free to move from the float reservoir 6 through the aperture 7 into the reservoir 1 but the outlet valve 4 is closed. As the water can move freely from above to below the buoyance chamber the buoyancy thereof will tend to move the float means upwardly in the reservoir 1 to a position substantially as illustrated in FIGURE 1. The valve means is then operated to close the valve 8 and to open the valve 4 to discharge the water from below the float means. With the valves in this position the float means is moved to the lower position as illustrated in FIGURE 2. The downward stroke is the normal operative stroke of the unit and the weight of the water supported in the float reservoir provides an additional thrust to the operating stroke without in any way retarding movement on the upward stroke.

It will be appreciated that a number of valve means may be used to achieve the above results. We have found that a particularly satisfactory valve and valve actuating arrangement is provided as follows:

A transverse support member 12 extends across the reservoir 1 and dependent therefrom centrally through the float reservoir 6 is a fixed actuating arm 13 having limit stops 15 and 16 fixed thereto. A disc valve 14 is fitted about the arm 13 between the stops 15 and 16 and is arranged to engage with a valve seat 17 to prevent passage of water from the float reservoir 6 through the aperture 7. Restraining means 18 are provided to hold the valve disc 14 away from the valve seat when in the open position and prevent the valve disc from closing merely under the influence of gravity.

A further arm 19 extends from the lower end of the arm 13 and has relative reciprocal motion thereto. A disc valve member 20 of the valve 4 is associated with the lower end of the arm 19. Limit stops 21 and 22 are provided on the arm 19 and are arranged to co-act with a sleeve 23 which has levers 24 extending from either side thereof pivoted on posts 25 attached to suitable support means 26 at the lower end of the buoyance chamber 5. The lever arms 24 project beyond the post 25 and are each pivotally attached to a vertical lever arm 27 which is fixed at its upper end to the disc 14 of the valve 8.

The disc 20 is also arranged to seat on a suitable valve seat 28 and restraining members 29 are again provided to prevent the disc closing merely under the influence of gravity.

Both valves 4 and 8 have a metal disc valve member provided with an annular metal proturberance 30 arrange to engage with a metal valve seat to form a metal to metal seal. In this way a satisfactory valve member is provided without the use of rubber or other sealing gasket which could deteriorate over a period of time.

The use of the above described invention will be clear from the foregoing. Assume the valves 4 and 8 are in a position as illustrated in FIGURE 1, that is, the valve 8 is open and the valve 4 is closed. The float means will tend to rise in the reservoir 1 and eventually the disc 14 will engage with the stop 15. The float means will continue to rise but the disc 14 is held against the stop 15 and will be forced past the restraining means 18 to seat on the valve seat 17. At the same time the sleeve 23 and stop 21 are arranged so that the force tending to lift the float applies a force to the lever 24 and through the post 25 the arm 19 will be lifted thereby opening the valve 4 by raising the disc 20.

The valve means are then in the position as illustrated in FIGURE 2, that is, with the valve 8 closed and the valve 4 open. Water beneath the float means will pass out through the outlet 3 and the float means will fall. The body of water supported in the float reservoir on top of the buoyance chamber ensures that a considerable force is generated by this downward movement of the float means.

When the float means reaches the lower position the disc 14 will co-act with the stop 16. Further downward movement of the float means will cause the disc to be raised from the valve seat thus opening the valve 8 to allow water to pass from the float reservoir 6 through the apertures 7 into the reservoir 1 beneath the float means. At the same time the location of the disc against the stop 16 causes the levers 27 and 24 to operate so that the sleeve 23 engaging the stop 22 to apply a force to the arm 19 and move the disc 20 past the restraining means 29 to seat on the valve seat 28 thereby closing the valve 4. Water will then flow from the float reservoir through to the reservoir 1 thereby allowing the float means to rise to a position as indicated in FIGURE 1. The above cycle will continue to operate provided there is a sufficient flow of water. It will be clear that the apparatus will operate intermittently, that is, if for any reason the flow of water is terminated the apparatus will automatically cease and once the flow of water starts again the apparatus will commence to operate.

In FIGURE 1 the gantry means 31 is associated with the float means and is arranged to operate the piston 32 of a pump 33, the pump has the inlet 34 arranged to draw water from the float reservoir 6 and discharge the water through the outlet 35. It will be appreciated the power may be used for other purposes if so desired. Also the diagrammatic representation illustrates the unit driving one pump only but by suitable modification of the power take-off means attached to the apparatus one or more pumps may be driven thus allowing water to be delivered to various points by the same driving apparatus. Also a two way pump could be operated utilising the buoyancy of the float means to provide the force for the upward stroke and the weight of the float including the weight of the water trapped in the float reservoir for the thrust of the downward stroke.

The apparatus can be installed where there is only a small head of water provided water can be caused to move through the inlet 2 and out from the outlet 3. A considerable practicable advantage is achieved because the pump is positioned above the operating unit thereby increasing the effective height to which water may be pumped.

As stated above the valve mechanism illustrated in the drawings is the preferred form only. Alternate forms of valve mechanisms are illustrated in FIGURES 4 to 7 of the drawings. The operating principles are generally the same as described above.

In FIGURES 4 and 5 a control valve is provided to control the flow of water past the float means. The valve mechanism operates in a passageway 36 with a valve rod 37 extending therethrough. Attached to adjacent the upper end of the valve rod 37 is a valve plate 38 and a float 39. Attached to adjacent the lower end of the rod 37 is a suitable recess 40 is a non-return valve 41 and a weighted float 42. An operative abutment 43 is provided extending up from the base of the reservoir 1.

The operation of the valve is as follows:

When the float reservoir 6 is rising the weighted float 42 of the valve mechanism is just floating. The float 39 associated with the valve plate 38 keeps the valve plate above the valve seat and opens the passageway 36. When a predetermined level has been reached the outlet 3 is opened by the head 44 coacting with stops and the valve 45 lifted (see FIGURE 5). The water beneath the float is then released and when this happens the weighted float 42 becomes a weight instead of a float and pulls down the valve plate 38 and closes it on its seat. When the float 5 reaches the bottom of its stroke, that is, the lower position, the weighted float 42 sits on the abutment 43 causing the valves to change position and allowing the water once again to pass through the float.

FIGURE 6 is a diagrammatic representation of an alternate linkage which may be used to operate the lower valve controlling the outlet from the reservoir 1. In this case the float reservoir 6 causes the member 46 to move out releasing the catch 47 from the shoulder 48. The weight 49 now operates to move the lever as illustrated in the drawings to raise valve 50.

A further alternate form of valve actuating means is illustrated in FIGURE 7. In this case a larger opening 51 is provided through the buoyancy chamber 5. Disc valves 14a and 20a are arranged to control the opening through the buoyancy chamber and the outlet from the reservoir as was above described. In this case the valve actuating means are modified by providing a hollow outer arm 52 dependent from transverse member 53 extending across adjacent the top of the float reservoir 6. An inner arm 54 passes through the outer arm 52 and has a lower limit stop 55 attached thereto below the outer arm 52 and an upper limit stop 56 attached thereto above the outer arm 52.

The disc valve 14a is slidably mounted on the outer arm 52 and the disc valve 20a is fixed to the lower end of the inner arm 54.

A lever system is arranged to provide movement in the reverse direction to the float reservoir. The lever system is associated with the stops 55 and 56 and comprises lever arms 57 extending on either side of the stop 55 and pivotally attached to posts 58 projecting from the base of the reservoir 1. At the upper end a similar arrangement is provided from the upper stop with the lever arms 59 extending from the stop 56 and pivotal about posts 60 dependent from a suitable support member 61 attached across the top of the reservoir 1. For example, the support member may also be used to support a pump 62. Connecting levers 63 connect the outer ends of the levers 59 and 57. Stops 64 and 65 are provided on the connecting rod 63 and are arranged to change the position of the valve 14a at each end of the operating stroke.

Thus in operation when the float reservoir descends the outer arm 52 will coact with the stop 55 adjacent the bottom of the stroke. This will cause the valve 20 to be closed and through the action of the lever means the stops 64 will engage with the discs 14a to open the valve. When the float means reaches the top of its operating stroke the upper end of the outer arm 52 engages with the stop 56 causing the valve 20 to be lifted off the valve seat opening the valve and at the same time operation of the lever means causes the stop 65 to engage with the valve disc 14a to close the valve.

What we claim is:

1. Hydraulically operable drive means comprising a reservoir for a liquid, an inlet to supply liquid to said reservoir, an outlet to discharge liquid from said reservoir, float means operable in said reservoir to move between two positions with movement towards the first position occurring with the liquid in the reservoir free to move from above to below the float means so that the buoyancy of the float means operates to raise the float means in said reservoir and with movement towards the second position occurring with the liquid below the float means released to pass out through said outlet while retaining at least some of the liquid above the float means to increase the thrust moving the float means to the lower position, valve means to control the movement of the liquid, valve actuating means to control the position of the valve means and power take-off means associated with the float means resulting in a reciprocal take-off drive.

2. Drive means as claimed in claim 1 wherein said reservoir comprises an outer tank having an outlet in the base thereof and an inlet arranged to supply liquid and preferably water into the top thereof and said float means comprises an inner tank having a buoyancy chamber in the lower part thereof and a float reservoir arranged to hold a supply of liquid in the upper part thereof, an opening extending from said float reservoir through said buoyancy chamber and a valve member arranged to control the flow of liquid through said opening with the inner tank reciprocally operable within the outer tank and arranged so that the side walls of the outer tank operate as guiding means to guide the reciprocal movement of said inner tank.

3. Drive means as claimed in claim 2 wherein the valve and valve actuating means are arranged so that when the valve controlling the opening through the buoyancy chamber is closed the valve controlling the outlet from the outer tank is opened and when the valve controlling the opening through the buoyancy chamber is open the valve controlling the outlet from the outer tank is closed.

4. Drive means as claimed in claim 3 wherein said valve actuating means comprises a main arm dependent from a transverse member attached across the adjacent top of the reservoir, a disc valve member associated with said arm and arranged to seat on a valve seat to close the opening through said buoyancy chamber, a second arm extending from the lower end of the first arm and having relative reciprocal motion thereto, a disc valve member associated with said second arm and arranged to close the outlet from said reservoir, limit stops on the first and second arms, lever means extending from the disc valve on said main arm and pivotally associated with the float means to engage with the stops on the second arm to operate in a manner such that when one valve is open the other is closed.

5. Drive means as claimed in claim 4 wherein stops on the main arm are arranged to coact with the disc valve member to move the member from an open to a closed position as the float means moves between its two positions in the reservoir, a sleeve or guide means slidably engageable with the second arm arranged to engage with the stops thereon, first lever arms pivotally attached to said sleeve means and extending from either side thereof and pivotally attached intermediate the length thereof to a member associated with said buoyancy tank and connecting levers extending from said disc valve to the outer end of said first lever arms, the construction and arrangement being such that as said disc valve member is located by the stop members on the first arm, the continued movement of the float means applies a force through the levers to operate upon the stop on the second arm to actuate the second valve.

6. Drive means as claimed in claim 3 wherein said valve means and valve actuating means comprise a hollow outer arm dependent from a support member in said float reservoir and disc valve member slidably associated with said outer arm and arranged to seat upon a valve seat to close the opening through said buoyancy chamber, an inner arm extending through said hollow outer arm and attached at its lower end to a disc valve arranged to seat on a valve seat to close the outlet from said reservoir, a lower limit stop attached to said inner arm below the outer arm, an upper limit stop attached to the inner arm above the outer arm, lever means operatively associated with said upper and lower limit stops so that when said limit stops are contacted by the float reservoir at the upper and lower limits of its operating stroke, the lever means will generate a reverse movement to the motion of the float means in said reservoir, and stop means on said lever means arranged to engage with said disc valve controlling the opening through said buoyancy chamber so that when one valve is open the other valve is closed.

7. Drive means as claimed in claim 6 wherein said disc valve members are metal members having an annular protuberance extending from the under surface thereof arranged to engage with a metal face of the valve seat to form a metal to metal seal.

8. Drive means as claimed in claim 7 wherein restraining means are provided to hold the disc valve in the open position until positively moved to the closed position under the action of valve actuating means.

9. Drive means as claimed in claim 4 wherein the valve controlling the apertures through said buoyancy chamber comprises a double acting float valve and the valve controlling the outlet from the reservoir comprises a lift-out plug valve.

10. Drive means according to claim 8 wherein said drive take-off means comprises a gantry member extending from suitable framework associated with said float means and arranged to be attached to the operating arm of a pump or other apparatus.

References Cited

UNITED STATES PATENTS 1,175,287   3/1916   Olmsted _____ 253—4
3,040,667   6/1962   Shaffer _____ 103—70

EDGAR W. GEOGHEGAN, Primary Examiner

U.S. Cl. X.R.

103—70; 253—10